INVENTOR.
EARL A. THOMPSON
BY
ATTORNEY

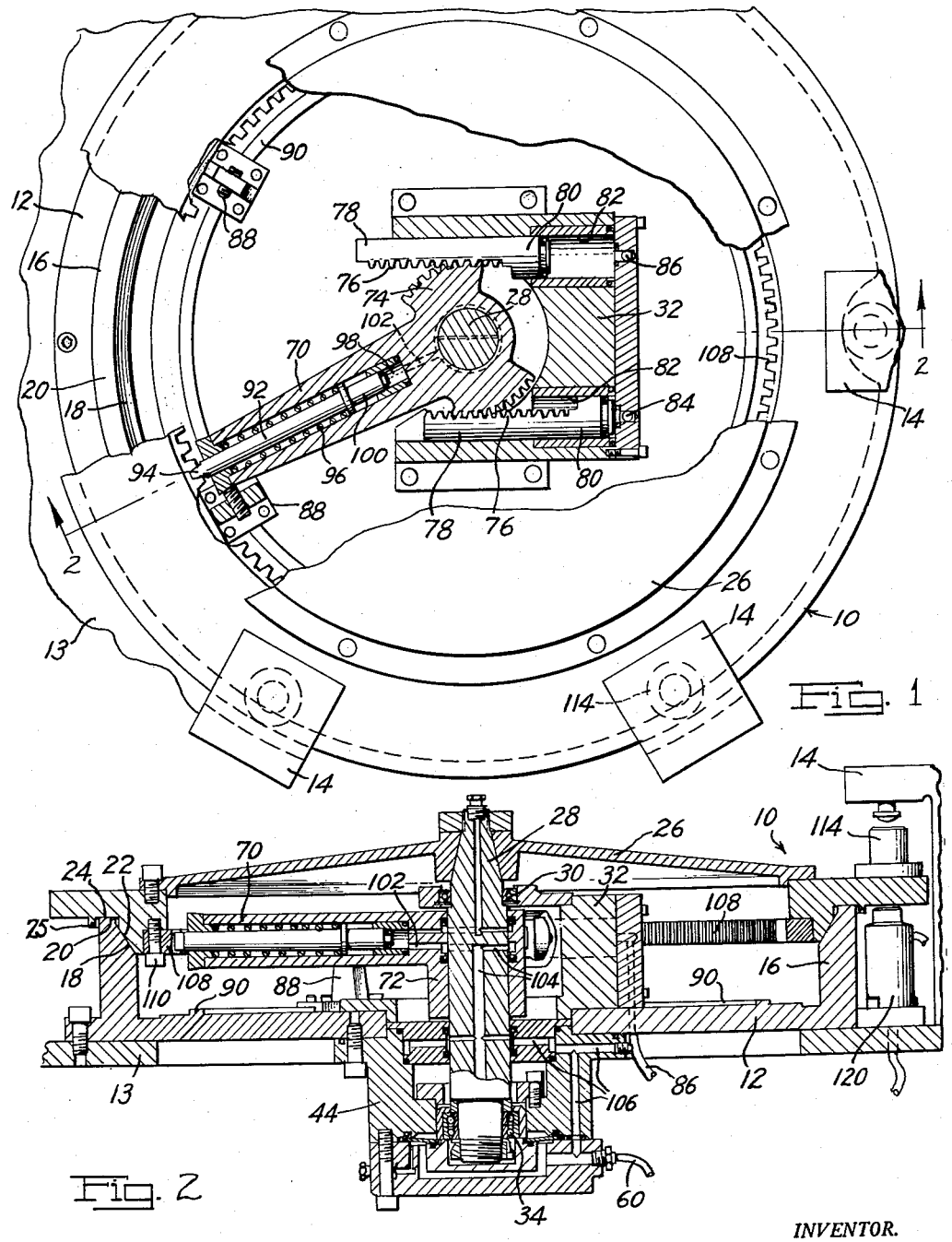

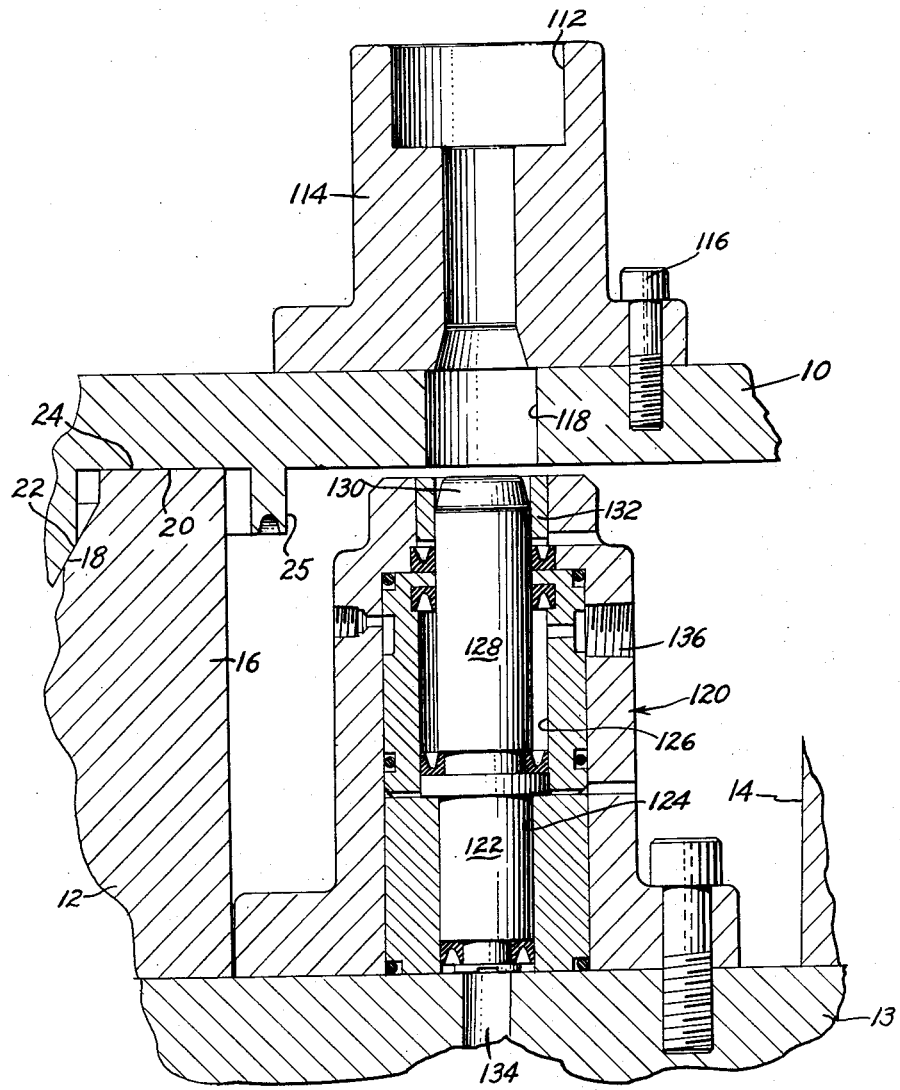

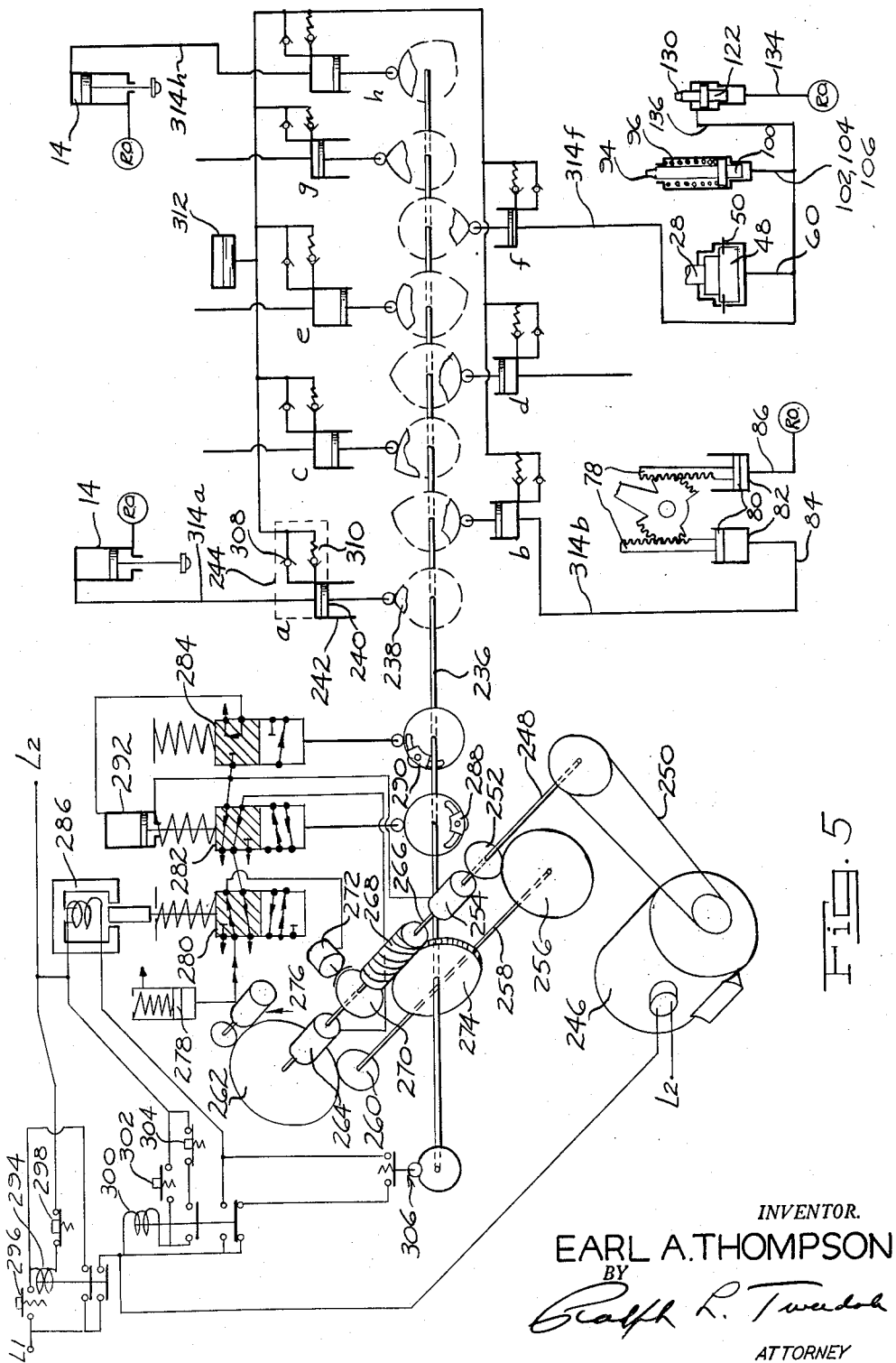

3,118,347
ROTARY INDEXING TABLE
Earl A. Thompson, 1300 Hilton Road, Ferndale, Mich.
Filed Mar. 14, 1960, Ser. No. 14,630
10 Claims. (Cl. 90—56)

This is a continuation-in-part of this inventor's copending and now abandoned application Serial Number 706,181 filed December 30, 1957.

The invention relates to rotary indexing machines and more particularly to those of the type utilized for successively indexing a rotary member or table to carry workpieces or tooling from one work performing station to another around its periphery, or that of an endless chain for which the member acts as a sprocket.

Indexing tables of this class are widely used in machine tools, assembling machines and other devices where material in high volume production must be successively presented seriatim to a variety of production operations.

Prior rotary indexing tables are commonly driven either by Geneva gearing or by a rotary motor, either electric or hydraulic, which is provided with suitable switching or valving for starting and stopping the motor with each indexing step. The Geneva gearing is not suitable for many applications because of the little flexibility it allows in the ratio between indexing time and dwell time. The rotary motor drive for starting and stopping control, while allowing a wide latitude in this ratio, is somewhat complex and expensive and has found little use apart from rather large machinery.

Another problem which prior rotary indexing tables imposed lies in the difficulty of reliably obtaining repetitive positioning and suitable supporting of the table with a high degree of accuracy and rigidly not only with respect to angular position but also as to concentricity with its rotating axis. This problem is particularly troublesome in machines where the table receives substantial end or side thrust from one or more of the work performing stations associated therewith. Prior to the present invention it has been necessary to utilize large and expensive anti-friction bearings with diameters of the same order of magnitude as the table diameter if concentricity is to be maintained with reasonable accuracy.

Accordingly, it is an object of the present invention to provide an improved rotary indexing machine in which indexing movements and dwell time may be programmed with complete flexibility by comparatively simple and inexpensive apparatus.

A further object is to provide an improved rotary table indexing machine in which a high degree of positioning accuracy and stability may be established and maintained over a long useful life without requiring the use of large and expensive anti-friction bearings.

Another object is to provide an improved rotary table indexing machine in which the indexing movements of the table and operating movements of the associated work performing stations may be accomplished through a mechanico-hydraulic programming and driving system utilizing a set of cams on a single camshaft together with liquid column type motion transfer devices for transmitting cam motions to the driven parts.

A further object is to provide an improved rotary table indexing machine on which a sequence of movements conditioning the table for an indexing movement may be made sequentially in a minimum amount of time, and by a single actuating mechanism which will repeat the sequential movements accurately every time.

A still further object is to provide an improved rotary table indexing machine in which mechanism is provided for locating the workpieces in relation to the work performing tools placed around the periphery of the table with extreme accuracy and with mechanism that will not lose its effectiveness over a long, useful life.

Further objects and advantages of the present invention will be apparent from the following detailed description with reference to the accompanying drawings, in which like reference characters refer to the same parts throughout the several views, and in which:

FIGURE 1 is a top view with parts broken away of a rotary table indexing machine embodying a preferred form of the present invention;

FIGURE 2 is a vertical cross section of the machine taken along the line 2—2 of FIGURE 1;

FIGURE 4 is an enlarged vertical sectional view of the locating mechanism shown at the right hand portion of FIGURE 2; and FIGURE 5 is a diagrammatic view of a mechanico-hydraulic programming and drive system for operating the machine shown in FIGURES 1 and 2.

Figure 3:
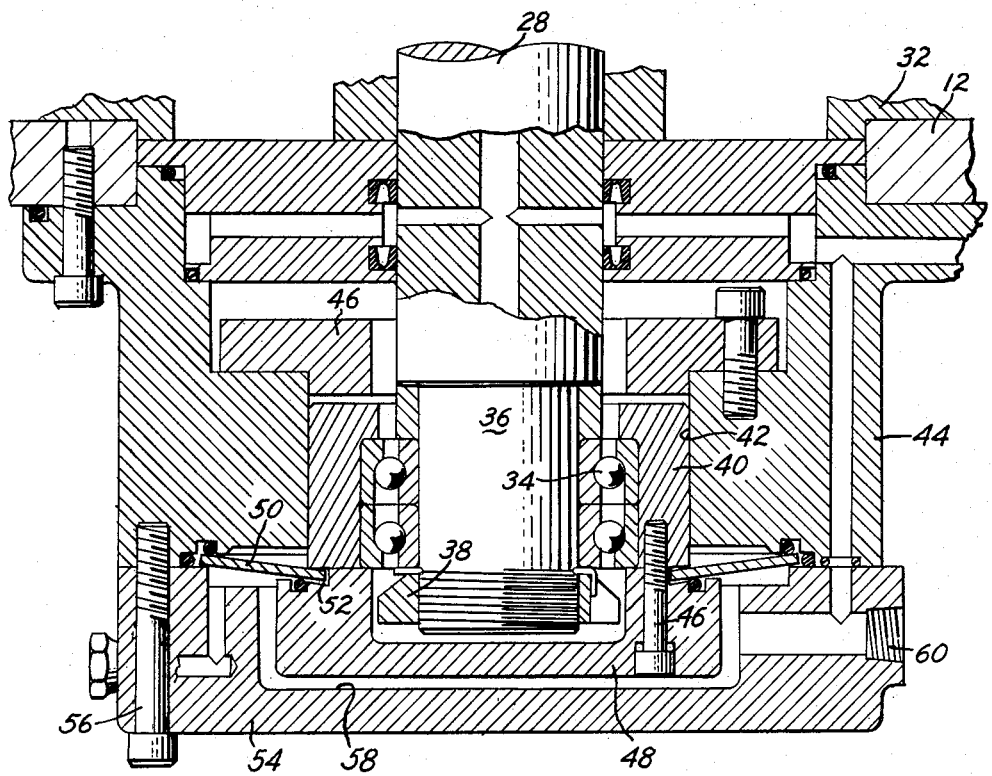
FIGURE 3 is an enlarged view of the table raising mechanism shown at the bottom of FIGURE 2.

Referring now to FIGURES 1 and 2, there is shown a rotary table 10 which normally rests on a frame or base 12. The frame or base 12 may be secured to an underlying frame or base 13 or other supporting means on a machine base. Secured to the frame or base 13 at a number of equa distant stations around the periphery of the table 10 are a plurality of work performing stations 14 where successive production operations are to be performed.

The stations 14 per se may be of any suitable type such that they may each be operated by an individual hydraulic motor. Typical examples of production operations of which these stations 14 are representative are devices for pressing, punching, staking, shearing, marking, assemblying, feeding, ejecting, drilling, filling, grinding and in fact any of the various operations utilized in high volume production.

For the purpose of centering and supporting the table while any of these work operations are being performed, the base 12 is provided with an upstanding cylindrical wall section 16, having its inner top corner bevelled to form a centering surface 18, and around its top a supporting surface 20 occupying a flat plane. The underside of the table has two surfaces 22 and 24 that mate, respectively, with the surfaces 18 and 20 when the table is pulled downwardly thereagainst. The application of proper lubricating compound to surfaces 18 and 22 assures, with any slight outward flexing of wall 16 as surface 22 descends against surface 18, that these two surfaces make intimate contact throughout their full extent and also that surfaces 20 and 24 make full contact and rigidly support the table against any downward axial thrust. To prevent any liquids or other foreign substance from interfering with the precise fitting of the centering and supporting surfaces, a lip 25 is provided on the underside of the table outside the wall 16.

The rim of the table 10 containing surfaces 22 and 24 is supported by means of a central web portion 26 fixed on the tapered top of a central spindle or shaft 28. Pivotal support 28 is mounted for limited axial up-and-down movement to effect a separation between the mating centering and supporting surfaces at the periphery of the table and the top of the wall, and is also mounted for rotary motion in bearings 30 extending from a boss 32 on the base 12, and is kept in axial alignment by another set of bearings 34 at its lower end. Bearings 34 are fitted on a reduced diameter portion 36 of the shaft 28 and secured thereon by locking nut 38, see FIGURE 3.

The outer race of the lower bearings 34 is contained in an annular sliding sleeve member 40 fitted within a smooth bore 42 in a housing 44 depending from the base 12. Bore 42 is closed at its upper end by an apertured member 46 through which the shaft 28 extends and which also serves to govern the amount of upward sliding of which the sleeve member 40 is capable. Secured to the lower end of the sleeve member 40 by suitable bolts 46 is a piston face or head unit 48 adapted to receive the inner diameter of a Belleville spring in a suitable annular groove 52. Belleville spring 50 is secured at its outer diameter to the depending housing 44 by means of a lower closure member 54 secured thereto by bolts or other suitable securing means 56. Lower closure member 54 is cored out to form a cavity 58 of a size large enough to include both the head unit 48 and a suitable fluid cavity around it. Oil or other fluid is admitted to this cavity through a connection 60.

Belleville spring 50 is loaded to continually urge shaft 28 downwardly, and this downward urging is limited only by the contact of surfaces of 18, 22 and 20, 24, respectively, at the periphery of the table. When oil under pressure is admitted through the connection 60 and into the cavity 58 between the member 54 and the unit 48, the upward pressure on member 48 and on the spring 50 causes the shaft 28 to move upwardly against the downward urging of the spring and raise the surfaces 22, 24 away from the surfaces 18, 20, respectively, and thus position the table for free rotation on its shaft 28 within the bearings 30, 34.

The rotating means comprises an arm 70 mounted for rotation at 72 about the shaft 28 which is also the table's axis of rotation. Gear segments 74 concentric with the shaft 28 at the inner end of the arm 70 engage the teeth 76 of two opposed racks 78 formed as part of two pistons 80 which are alternately reciprocable in cylinder sections 82. The two pistons 80 in their cylinder sections 82 comprise a double acting hydraulic motor which acts, as oil under pressure is admitted through connection 84, to swing arm 70 clockwise (FIGURE 1) and return it counter clockwise as oil is admitted through connection 86. The length of oscillation of arm 70 is governed by two adjustable limit stops 88 positionable anywhere around a track 90 which is formed as part of the base 12.

Within a bore in the arm 70 is a plunger 92 having a tooth or finger 94 at its outer end which is urged by a spring 96 inwardly toward the arm's axis of oscillation. The inner end of the plunger 92 fits within a cylinder 98 and is formed as a piston 100. Oil under pressure is admitted to cylinder 98 by means of a bore 102 in the arm which communicates with suitable bores 104 in the shaft 28 to which oil is in turn introduced by other passages 106 in the housing 44 (see FIGURE 2) from the connection 60 which also admits oil to the cavity 58 for raising the table.

Around the periphery of table 10 is mounted a ring gear having very accurately cut teeth 108. The gear is secured to the table by means of bolts 110 extending through holes in the gear. By utilizing a plurality of holes, the gear can be rebolted to the table in different positions to expose new and unworn teeth to the finger 94 of the rotating means in order that precision indexing be maintained through a long and useful life of the machine. Admission of oil under pressure to the cylinder 98 in the arm 70 will extend the plunger 92 until the finger 94 on the end of the plunger is snugly engaged with the teeth 108 of the ring gear. As soon as this engagement is established, admission of oil to one of the cylinders 82 through connection 84 will oscillate the arm 70 in one direction between the limit stops 88, and the table 10 will rotate therewith as a result of the connection established between the finger 92 on the arm and the teeth 108 on the table's ring gear. This can take place quite rapidly, say in less than ⅔ of a second, for instance, for sixty degrees of angular movement.

After the table has been indexed by oscillation of the arm 70 until it contacts its limit stop 88, the table must be accurately located angularly so that the workpieces will be precisely positioned in relation to the tools around the edge of the table before the table is lowered to center and support itself on the surfaces 18 and 20 on the base. The workpieces are positioned in sockets 112 which have an enlarged portion at their top to receive the workpiece and a tapered portion at the bottom. These sockets 112 are formed in brackets 114 adjustably secured to the table by means of bolts 116 at equa-angularly spaced locations in a circle concentric with the table's rotating axis. Directly below the sockets 112 in brackets 114 there are holes 118 in the table of a diameter somewhat larger than the outer diameter of the tapered portion of the socket (see FIGURE 4).

Positioned directly below one of the work stations 14, probably the one which would require the most accurate locating of the workpiece, is the locating mechanism 120 which consists of a piston 122 reciprocable in cylinder sections 124, 126 and having extending upwardly therefrom a piston rod 128 with a tapered end 130. The tapered end is accurately guided for reciprocation in a replaceable sleeve 132. Oil under pressure admitted through connection 134 to the lower face of piston 122 continually urges the piston upwardly and the tapered locating end portion 130 through the hole 118 in the table and into the tapered portion of the workpiece socket 112. Thus the workpiece socket 112 in the bracket 114 is the member that is actually positioned by the locating device 120, and not the table itself which is subject to dimensional variations as a result of temperature changes, forces occasioned by the thrust of various tools 14, and other influences.

When the table is to be rotated, oil is admitted through connection 136 to the upper face of the piston 122 at a pressure higher than that admitted through connection 134. The pressure on the upper face of the piston 122 overcomes that against the lower face; the tapered portion 130 of the locating mechanism is retracted from the tapered portion of the workpiece socket 112 and down through the hole 118 in the table, thus allowing the table to be rotated. After the table has been raised from the supporting surface 20 and the centering surface 18 and rotated by the arm 70, oil is allowed to drain away from the upper face of the piston 122 of the locating mechanism back through connection 136, and the piston is again raised by the pressure of the oil being admitted through connection 134 until the tapered portion 130 has accurately located the workpieces. Then, as the table is lowered onto its centering and supporting surfaces 18 and 20, respectively, the piston 122 is also forced downwardly a small amount therewith, insuring an even more positive locating association of the tapered portion 130 in the tapered portion of the workpiece socket 112.

Since, prior to angular indexing of the table 10, it is desirable to have the table raised from its centering and supporting surfaces 18, 20 before the finger 94 engages the table's ring gear, and it is desirable to have the ring gear engaged by the finger before the locating mechanism 130 is released from the socket; and since, after the table has been indexed, it is desirable to have the locating mechanism 130 engage the workpiece socket before the finger 94 on the arm 70 is retracted, and it is desirable to have the finger retracted before the table is lowered by the action of the Belleville spring 50 into engagement with the supporting and centering surfaces: a unique arrangement is provided to insure that this desired sequence takes place in a minimum amount of time before and after each indexing of the table. This is best described by reference to the lower right hand corner of FIG. 5, where the three actuating mechanisms for these three sequential movements are shown schematically.

Belleville spring 50 is designed to urge the table toward the base with a predetermined amount of force. The spring 96 in the oscillating arm is designed to require more fluid pressure to overcome its power than does the Belleville spring 50, and to urge the finger 94 out of engagement with the table with a force exceeding that of the spring 50. Biasing means 134 (which in this case is hydraulic pressure and not a spring) urges the locating mechanism 130 into engagement with the table with a force greater than that by which the finger 94 is urged out of engagement with the table. It will be understood that the actual spring means, whether mechanical or hydraulic, need not themselves be of more or less force than the other springs, but the face area of the pistons 48, 100 and 122 are, in practice, of varying areas so that the effective forces required to overcome the springs will vary by a predetermined amount to obtain the desired priority of movement. It will be noted from the diagram that the fluid admitted to the faces of these three pistons for overcoming the three springs or urging means is connected from each cylinder to a single hydraulic supply line 314f.

Thus, as oil pressure in line 314f increases, Belleville spring 50 will first be overcome by pressure on the face of piston 48 and the table will be raised off of its centering and supporting surfaces. Secondly, the spring 96 will be overcome by the now high pressure of the fluid on the face of piston 100 and the finger 94 will engage with the ring gear on the table. Finally, hydraulic pressure at 134 will be overcome by the action of the still higher oil pressure on the upper face of piston 122 and the locating mechanism 130 will be retracted from the workpiece socket. This predetermined sequence will occur without fail and can, depending on how quickly oil pressure is increased in line 114, accomplish all three movements in their timed sequence in a very short interval.

After the table has been indexed, the required amount of oil is rapidly drained from line 314f and, in a very short time (measured again in a fraction of a second) the locating mechanism engages with the table, the arm's finger is retracted from the ring gear of the table, and the table is lowered to the centering and supporting surfaces on the base. Then the tools around the periphery of the table immediately commence their operation. It will be understood that several spring loaded fluid motors in tandem with a single fluid pulsator unit could be used for any type of operation where a particular priority of motion is desired.

For the purpose of giving coordinated motivation to the various operating means for the table and for the work stations 14 there is provided a mechanico-hydraulic programming system for producing a cycle of coordinated movement, illustrated diagrammatically in FIG. 5. This system may be constructed as a self-contained unit having its own housing, not illustrated, which may be positioned at any convenient location on or adjacent the machine and connected to the various hydraulic cylinders by suitable flexible piping. The mechanico-hydraulic drive unit comprises a master camshaft 236 carrying a plurality of cams 238, the followers of which operate the transmitter pistons 240, each of which forms part of a liquid column type motion transfer device of which there are eight units shown in the diagram of FIG. 5. Each piston reciprocates in a cylinder 242 having a head 244 which contains a suitable inlet replenishing check valve 308 and a high pressure relief valve 310 both of which communicate with a low pressure oil reservoir 312 preferably formed in a housing enclosing the drive unit.

For turning the camshaft 236, a motor 246 drives an input shaft 248 of a two-speed transmission through a belt drive 250. The input shaft 248 drives a pinion 252 and also the input member of a hydraulically-engaged, spring-released clutch 254. Pinion 252 drives a gear 256 secured to a countershaft 258 which carries a pinion 260 at its opposite end. Pinion 260 drives a gear 262 and therewith constitutes a set of change speed gears. Gear 262 drives the input member of a second hydraulically-engaged, spring-released clutch 264. The driven members of clutches 254 and 264 are secured to the opposite ends of a shaft 266, having a worm 268 thereon and a brake drum 270. The latter has a spring-biased hydraulic motor 272 for engaging the brake. Worm 268 drives a worm wheel 274 secured to the master camshaft 236.

For the purpose of automatically controlling the starting, stopping, and speed of the transmission, there is provided a hydraulic control pump 276 driven from gear 262, which may circulate a body of oil contained in the housing surrounding the transmission. The pump 276 may deliver to a combined accumulator and relief valve comprising a spring loaded piston 278 and also supplies oil to a bank of control valves 280, 282 and 284. In the diagrams each valve is shown as a two-position valve, spring-biased to the position illustrated in which the connections shown in the cross-hatched rectangles are established. Single-headed arrows are used to indicate flow at reservoir pressure and double-headed arrows to indicate flow at pump delivery pressure. Each of the valves, when shifted, establishes the connections shown in the unhatched rectangles immediately below the hatched rectangles.

Valve 280 is arranged to be shifted by a solenoid 286. Valves 282 and 284 are arranged to be shifted by the adjustable cams 288 and 290, respectively, which are positioned on camshaft 236. In addition, the valve 282 has a hydraulic holding cylinder 292 which holds the valve 282 in its shifted position until it is released by the shifting of valve 284. Valve 280 in the position shown delivers pressure fluid to engage the brake 272 and also exhausts fluid to release the low speed clutch 264. When shifted, valve 280 exhausts fluid to release brake 272 and supplies pressure fluid to engage the low speed clutch 264, subject, however, to a conjoint control by the valve 282.

The latter valve, in the position illustrated, exhausts fluid to release the high speed clutch 254 and places the low speed clutch 264 under the control of valve 280. In its shifted position, valve 282, provided valve 280 has been shifted, delivers pressure fluid to engage high speed clutch 254 and exhausts fluid to release low speed clutch 264. As previously explained, the valve 284 is merely a reset valve for bypassing the holding cylinder 292 to permit valve 282 to return to its spring biased position shown in the drawings.

Thus, energization of solenoid 286 will start the camshaft rotating at slow speed. Thereafter, the cam 288 will shift the transmission to drive the camshaft at high speed, and still later the cam 290 will again shift the transmission to slow speed. So long as the solenoid 286 remains energized, the camshaft 236 will continue to rotate, first at a slow speed and then at a high speed during each revolution, controlling its own speed changes by operation of the cams 288 and 290.

For the purpose of controlling the drive motor 246 and solenoid 286, there is provided an electric control circuit connected between a pair of electric supply lines, designated L1 and L2. The circuit may include a master relay 294 of the holding type having a manual master start switch 296 and a manual master stop switch 298. Relay 294 controls the motor 246 and also a cycle control relay 300 of the holding type having a manual cycle stop switch 304. The normally open contacts of relay 300, which are of the make-before-break type, control energization of cycle solenoid 286 directly. The normally closed contacts of relay 300 also control solenoid 286, but are in series with a cam switch 306 on the end of the camshaft 236 and arranged to be opened once during each revolution thereof. The arrangement is such that when the cycle stop switch 304 is operated at any point in the rotation of camshaft 236, relay 300 will be de-energized, but solenoid 286 will remain energized until cam switch 306 opens at the predetermined stopping point. Operation of the master stop switch 298, however, will de-energize solenoid 286 immediately, regardless of the point in the cycle and will also de-energize motor 246.

The camshaft 236 as previously mentioned drives a number of cam operated hydraulic pulsator sections designated a through h, inclusive. Each section may comprise units duplicating the single acting pulsating cylinder 242, the head 244 of which contains the replenishing check valve 308 and the spring closed release valve 310. All the replenishing and relief valves are connected to a common oil reservoir 312 formed in the housing of the unit. The reservoir 312 is preferably subjected to a low, super-atmospheric pressure by a body of compressed air or other pressure maintaining arrangements. Check valves 308 allow flow from the reservoir 312 to the cylinder 242, while relief valves 310 allow flow oppositely when the cylinder pressure exceeds a certain value. Thus each of the pairs of valves 308 and 310 may be referred to as a balancing valve and serve to balance the volume of fluid in each of the liquid column sections, as will be later described.

The pulsator sections *a* and *h* are connected by closed liquid column lines 314*a* and 314*h* with two of the work performing stations 14, as shown in FIGURE 5. Similarly, the closed liquid column lines for the sections *c*, *d*, *e* and *g* may be connected to others of the work performing stations. The pulsator section *b* is connected by a closed liquid column line 314*b* with the connection 84 of the cylinder 82 for oscillating the arm 70 between its limit stops 88. The pulsator section *f* is connected by closed liquid column line 314*f* with the three sequentially operable fluid means for raising the table, engaging the arm's finger, and disengaging the locating mechanism.

In order to insure proper synchronization of the driving and driven elements of each pulsator section, it is desirable to provide slightly more fluid displacement in the driving or transmitting elements 240–242 than is present in their respective fluid motors at the opposite end of the liquid column line. Thus at the end of each advancing stroke of the transmitter piston 240, a small amount of fluid will be discharged to reservoir 312 through its relief valve 310. This amount plus any amount lost by leakage will be returned to the liquid column at the end of the return stroke by the operation of the replenishing valve 308.

In FIGURE 5 there are shown several circles marked RO connected to the end of some of the motive cylinders opposite the liquid column connections. These symbols designate the return oil connections by means of which a pulsator system may be hydraulically biased so as to maintain the follower in close contact with the cam as the falling portion of the cam contour recedes from the follower. Consequently, the strongest urging means of the three sequential operations in the lower right-hand corner of FIGURE 5 must be of the hydraulic type. This bias is maintained by a high pressure accumulator or oil reservoir, not shown, which may be provided with a manifold whereby all of the RO connections are joined together and to the high pressure reservoir. The showing of separate return oil connections in FIGURE 5 is indicative of any suitable type of biasing pressure source, whether it be a single accumulator or multiplicity thereof. The contours of the individual cams 238 are likewise not illustrated in specific detail since they may be formed in accordance with the usual practice to cause motivation of each of the respective hydraulic motors in accordance with the particular operating cycle desired for the machine. Likewise the speed ratio between the high and low speeds of the cam shaft 236, and the duration of the high speed portion of the cycle, may be selected as desired through use of the appropriate change gears 260–262 and through the adjustment of the cams 288 and 290, if desired. Of course, the two speed feature of the transmission may be omitted and the high speed clutch 254, the cams 288 and 290 and the valves 282 and 284 eliminated.

In operation, with the reservoirs RO and 312 filled with oil and with a body of compressed air at relatively respectively high and low pressures, the master start switch 296 is closed to start the motor 246 of the mechanico-hydraulic drive and control unit. A series of cycles may then be initiated by operation of the cycle start switch 302. This energizes relay 300 which in turn energizes solenoid 286 to shift the starting valve 280 and cause operation of the cam shaft 236 at its slow speed as previously explained; during the slow speed portion of the cycle the various work performing stations 14 may be operated from the pulsator units.

When these operations have been completed, the rapid speed cam 288 will shift the valve 282 which will be held in a shifted position by cylinder 292, thus causing the master cam shaft 236 to rotate at rapid speeds, being driven through clutch 254 instead of clutch 264. Thereafter the first event will be the lifting of the work table from its conical centering surface and flat supporting surface by the initial action of the pulsator section *f*; as the pulsator section *f* continues its action, the finger 94 will then engage the teeth on the gear 108 of the table; and, finally, the locating mechanism 130 will be retracted from the work piece socket on the table. The table 10 is then supported upon spindle shaft 28 for rotation in the bearings 30, 34 and on the oil in cavity 58. As the action of pulsator section *f* is being completed, pulsator section *b* will come into action to cause reciprocation of the pistons 80 in their cylinders 82, and the racks 78 will oscillate the arm 70 between its limit stops 88, thus rotating the table 10 to a position in which the next socket 112 is over the locating mechanism 120. The acceleration and deceleration involved in table rotating movement may be of any characteristic desired, as determined by the contour of the cam 238 for the pulsator section *b*. When this movement has been completed, the pulsator section *f* presents a receding cam face to the follower and pressure is relieved in line 314*f*, causing the locating mechanism 130 to be engaged with the table, the finger 94 to be retracted from engagement with the table, and the table to lower on the centering and supporting surfaces 18, 20, respectively, on the base, thus positioning the table for the commencement of the work operations which are powered and controlled by the other cams in the powering and controlling unit. The return of racks 78 to their starting positions may be accomplished during the slow speed portion of the cycle while the work stations 14 are performing their work and while the finger 94 is retracted from engagement with the table.

The operation above described will be repeated for each successive revolution of the master cam shaft 236, which continues in operation until the stop switch 304 is operated. As previously explained, this will bring the cam shaft to rest in its normal stopping position determined by the cam switch 306.

It will thus be seen that the present invention provides an improved rotary indexing table machine in which the timing of the index and dwell portions of the machine cycle is free of the severe design limitations inherent in Geneva gearing, and in which the mechanism is simple, reliable and flexible. Furthermore, the device provides a rotary table which is rigidly mounted when in the dwell phase of its cycle and may be utilized to accurately position parts while subjected to substantial thrust against the table and in which the various motions involved in indexing the table between work performing operations is accomplished in a minimum amount of time.

While the above described embodiment constitutes a preferred mode of carrying out this invention, many other forms might be adopted within the scope of the actual invention, which is variously claimed as:

1. A rotary indexing machine comprising a base, a table mounted for intermittent rotary motion relative to the base, an upstanding wall on said base, a centering surface bevelled on said wall, a supporting surface formed in a flat plane on said wall, two surfaces on the table and near the periphery thereof compatible with said centering surface and said supporting surface respectively, and means for axially moving said compatible surfaces apart during rotary motion of the table and bringing said compatible surfaces into mating contact during intermissions in rotary motion to center as well as support the table.

2. An indexing machine comprising a base, a plurality of work performing mechanisms mounted at spaced stations on the base, a table mounted on the base for intermittent movement, sockets on said table for holding workpieces and carrying them seriatim to the stations, a locating pin on said base designed to extend into any one of said workpiece sockets to lock the table relative to the base, and means to so extend the pin during intermissions in table movement.

3. A rotary indexing machine comprising a frame having a main pivotal support, a rotary table pivoted on said support, a supplementary supporting means comprising mating circular surfaces of large diameter relative to the main support and located on the frame and table respectively, means for intermittently indexing the table through successive angular movements, means operating in timed co-ordination with the indexing means for raising the table clear of the supplementary support before each indexing movement and lowering it between successive movements, and a mechanico-hydraulic motivator connected to operate each of said means, the motivator including a plurality of rotary cams driven in unison, a single-acting expansible chamber type pulse transmitter driven by each cam, a plurality of double-acting expansible chamber type pulse receivers connected with the said means, a plurality of liquid columns connected between the transmitters and the receivers to transfer motion therebetween, and a source of pressurized fluid and means connecting it to the receivers in opposition to the liquid column connections to counter-bias cam actuation.

4. A rotary indexing machine comprising a frame having a main pivotal support, a rotary table pivoted on said support, means for intermittently indexing the table through successive angular movements, a plurality of work performing tool carriers mounted on the frame and juxtaposed to the table at spaced work stations, and a mechanico-hydraulic motivator comprising a common rotary driving device, a plurality of cams connected to be rotated thereby and a plurality of liquid column type motion transfer devices each driven by a cam and connected to drive said indexing means and each of said tool carriers through a coordinated program of movements each revolution of said driving device.

5. A rotary indexing machine comprising a frame having a main pivotal support, a rotary table pivoted on said support, a supplementary supporting means comprising mating circular surfaces of large diameter relative to the main support and located on the frame and table respectively, means for intermittently indexing the table through successive angular movements, means operating in timed co-ordination with the indexing means for raising the table clear of the supplementary support before each indexing movement and lowering it between successive movements, a plurality of work performing tool carriers mounted on the frame and juxtaposed to the table at spaced work stations, and a mechanico-hydraulic motivator comprising a common rotary driving device, a plurality of cams connected to be rotated thereby and a plurality of liquid column type motion transfer devices each driven by a cam and connected to drive each of said means and each of said tool carriers through a coordinated program of movements each revolution of said driving device.

6. A rotary indexing machine comprising a table mounted for rotary movement, a mechanism for indexing the table through a predetermined angle, a plurality of work performing mechanisms mounted at spaced stations around the table and a common programming and driving system for the table and the mechanisms, including a camshaft, means for driving the camshaft through one revolution for each program cycle, individual cams on the shaft for each mechanism, and individual liquid column type motion transfer devices connected between each cam and its mechanism whereby the camshaft may drive the table indexing mechanism through one portion of a camshaft revolution and the work performing mechanisms through another part of a revolution.

7. A rotary indexing machine comprising a table mounted for rotary movement, a mechanism for indexing the table through a predetermined angle, a plurality of work performing mechanisms mounted at spaced stations around the table, a stationary rigid support for the table having contact therewith near the table periphery, mechanism for raising the table off the support while being indexed, and a common programming and driving system for the table and the mechanisms, including a camshaft, means for driving the camshaft through one revolution for each program cycle, individual cams on the shaft for each mechanism, and individual liquid column type motion transfer devices connected between each cam and its mechanism whereby the camshaft may drive the table indexing mechanism through one portion of a camshaft revolution and the work performing mechanisms through another part of a revolution.

8. A rotary indexing machine comprising a table mounted for rotary movement, a mechanism for indexing the table through a predetermined angle, a plurality of work performing mechanisms mounted at spaced stations around the table and a common programming and driving system for the table and the mechanisms, including a camshaft, means for driving the camshaft through one revolution for each program cycle, means controlled by the camshaft for changing the drive speed thereof during each revolution, individual cams on the shaft for each mechanism, and individual liquid column type motion transfer devices connected between each cam and its mechanism whereby the camshaft may drive the table indexing mechanism through one portion of a camshaft revolution and the work performing mechanisms through another part of a revolution.

9. A rotary indexing machine comprising a frame member having a main pivotal support, a rotary table member pivoted on said support, means, including a hydraulicly shiftable rack arrangement on one member and a pinion arrangement connecting it with the other member, for intermittently indexing the table member through successive angular movements, a hydraulic means associated with the pinion arrangement for disconnecting the rack arrangement and the other member so that the rack arrangement may be reset, and a mechanico-hydraulic motivator comprising a common camshaft and a plurality of liquid column type motion transfer devices connected to operate each of said means.

10. A rotary indexing machine comprising a frame member having a main pivotal support, a rotary table member pivoted on said support, means, including a hydraulicly shiftable rack arrangement on one member and a pinion arrangement connecting it with the other member, for intermittently indexing the table member through successive angular movements, a hydraulic means associated with the pinion arrangement for disconnecting the rack arrangement and the other member so that the rack arrangement may be reset, a table lock pin also operated in conjunction with the last named hydraulic means, and a mechanico-hydraulic motivator comprising a common camshaft and a plurality of liquid column type motion transfer devices connected to operate each of said means.

References Cited in the file of this patent

UNITED STATES PATENTS

| | | |
|---|---|---|
| 658,557 | Pitt | Sept. 25, 1900 |
| 912,124 | Hanson | Feb. 9, 1909 |
| 1,209,708 | Houlehan | Dec. 26, 1916 |
| 1,288,966 | Nielsen | Dec. 24, 1918 |
| 1,881,185 | Hazelton | Oct. 4, 1932 |
| 2,051,720 | Kingsbury | Aug. 18, 1936 |
| 2,120,877 | Uber | June 14, 1938 |

(Other references on following page)

UNITED STATES PATENTS

| | | |
|---|---|---|
| 2,135,639 | Gorham | Nov. 8, 1938 |
| 2,153,637 | Niven | Apr. 11, 1939 |
| 2,429,938 | Mansfield | Oct. 28, 1947 |
| 2,560,475 | Rehnberg et al. | July 10, 1951 |
| 2,588,977 | Gartner et al. | Mar. 11, 1952 |
| 2,622,487 | Shultz | Dec. 23, 1952 |
| 2,715,944 | Dohrer | Aug. 23, 1955 |
| 2,842,985 | Grover | July 15, 1958 |
| 2,900,849 | Hutchens et al. | Aug. 25, 1959 |
| 2,952,169 | Johnson | Sept. 13, 1960 |
| 2,975,657 | Samuel | Mar. 21, 1961 |